G. VON POST.
MILKING MACHINE.
APPLICATION FILED APR. 9, 1918.

1,325,179.

Patented Dec. 16, 1919.
3 SHEETS—SHEET 1.

INVENTOR:
Gustaf von Post
By Wm Wallace White
ATT'Y.

G. VON POST.
MILKING MACHINE.
APPLICATION FILED APR. 9, 1918.

1,325,179.

Patented Dec. 16, 1919.
3 SHEETS—SHEET 2.

G. VON POST.
MILKING MACHINE.
APPLICATION FILED APR. 9, 1918.
1,325,179.
Patented Dec. 16, 1919.
3 SHEETS—SHEET 3.
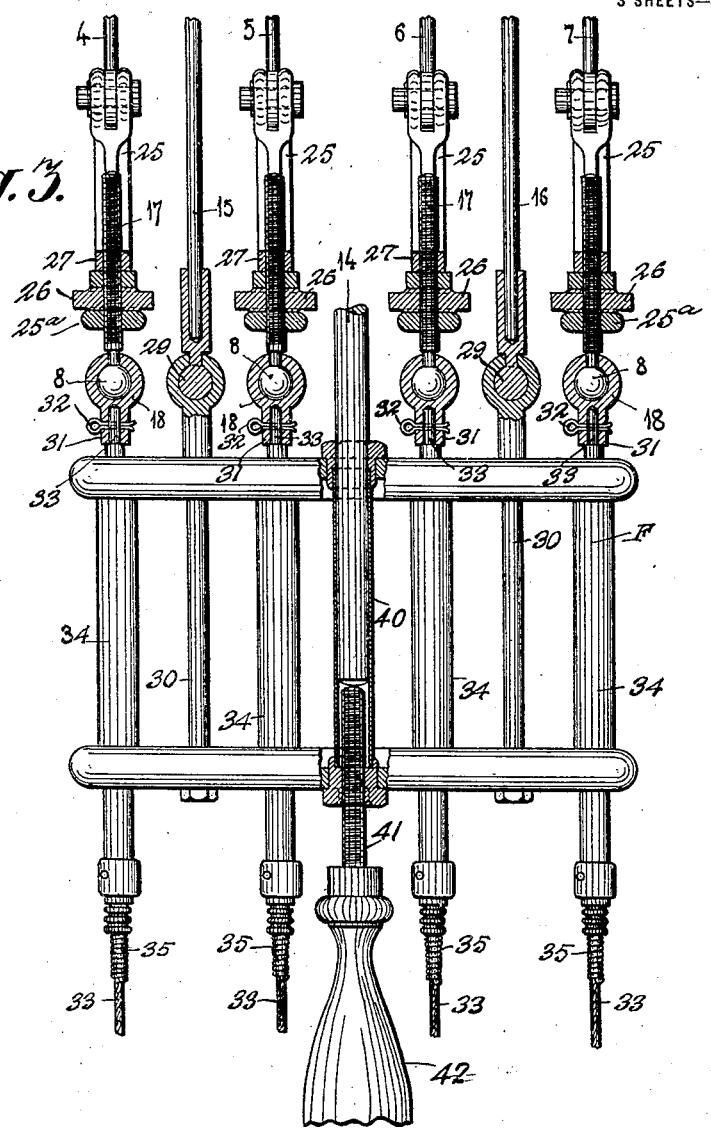
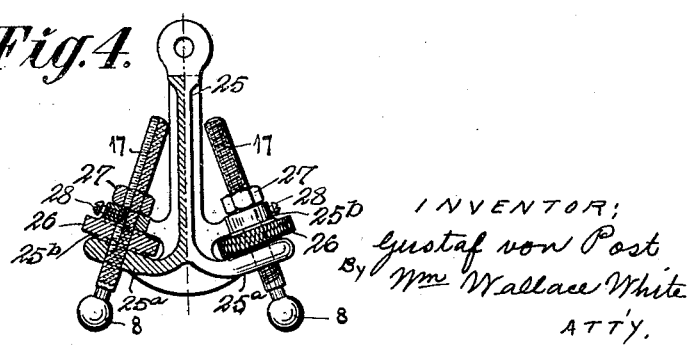

UNITED STATES PATENT OFFICE.

GUSTAF von POST, OF STOCKHOLM, SWEDEN.

MILKING-MACHINE.

1,325,179.  Specification of Letters Patent.  Patented Dec. 16, 1919.

Application filed April 9, 1918. Serial No. 227,584.

*To all whom it may concern:*

Be it known that I, GUSTAF VON POST, a subject of the King of Sweden, residing at Nybrogatan 46-48, Stockholm, Sweden, have invented new and useful Improvements in Milking-Machines, of which the following is a specification.

It is a well known fact that the quantity of milk obtained from one and the same cow in an essential degree is dependent upon the manner in which the cow is milked. Each cow therefore always must be milked in one and the same manner, but this does not mean that all the teats of a cow shall be treated with the same force and intensity.

By using milking machines, which never will give the same good result as hand milking, it is of course of very great importance that this circumstance be considered. It seems, however, that in the construction of milking-machines already known, this matter of fact has not been taken in consideration, probably because of the fact that such an individual milking is combined with many, since, for practical and economical reasons, the detachable part of the milking-machine must be used for milking a plurality of cows and the adjusting means cannot be arranged in this detachable part of the machine.

The present invention, however, which belongs to such mechanical milking-machines by which the teat-cups are actuated by means of Bowden-cables detachably connected to and coöperating with fixed driving means arranged at the side of each cow, that is to say, between each pair of cows, gives a satisfactory solution of the problem.

In the accompanying drawings a constructional form of the invention is illustrated.

Figure 1:
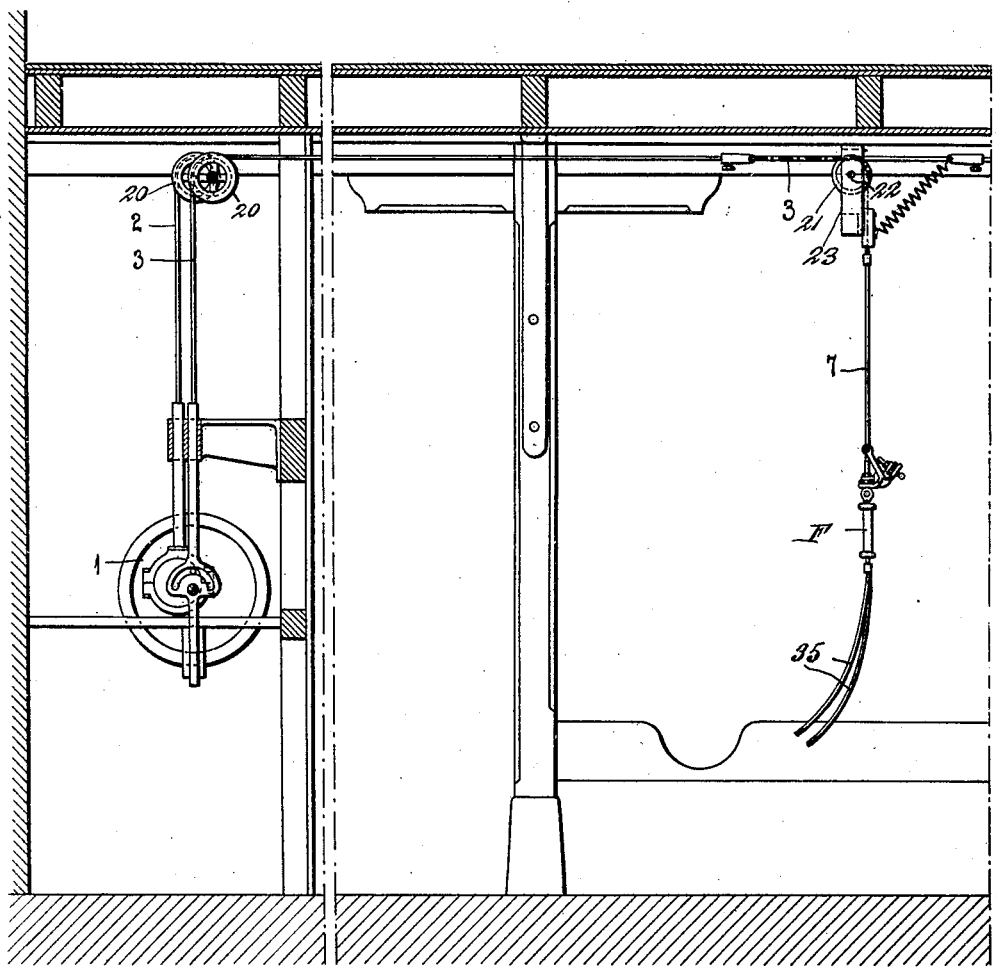
Figure 2:
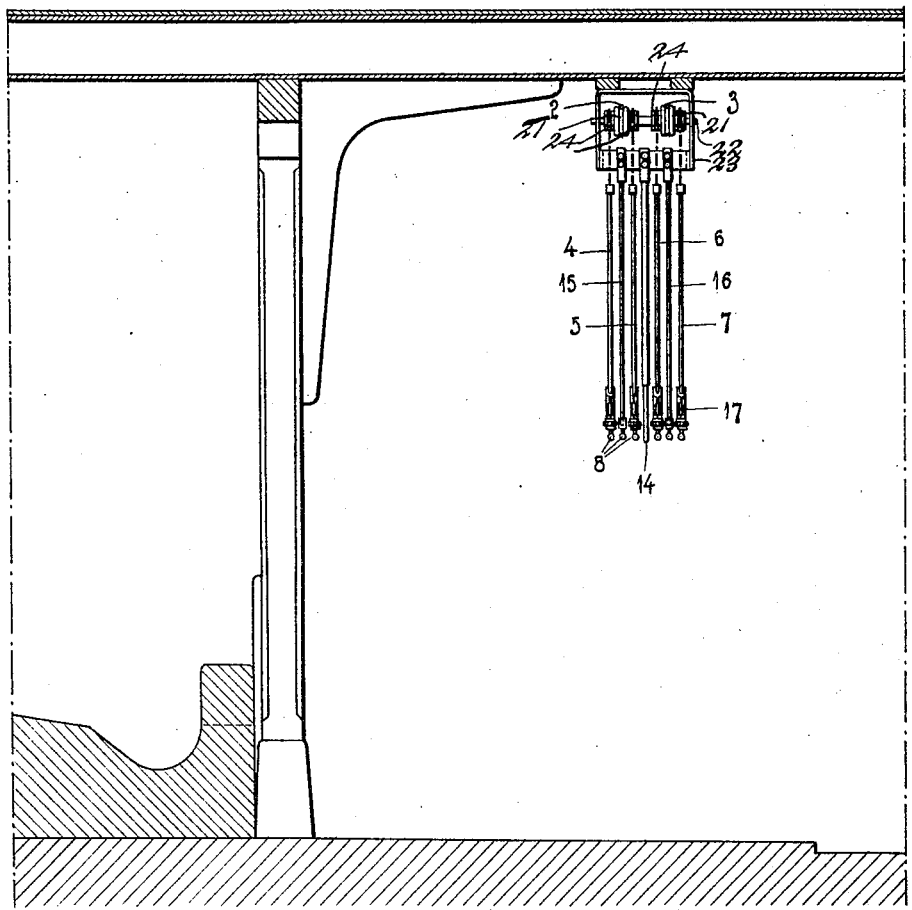

Figures 1 and 2 show a milking machine mounted in a cow house and seen from behind respectively from the side, and Figs. 3 and 4 are details.

Referring specifically to the drawings, and particularly to Figs. 1 and 2, 1 designates a suitable form of driving means for imparting reciprocating movements to cables 2 and 3, which latter are trained over pulleys 20 and 21 depending from the ceiling of the cow stable. As shown in Fig. 2, the pulleys 21 are fixed to a shaft 22 journaled in a yoke 23 secured to the ceiling, and fixed to the same shaft are other pulleys 24 to which are secured depending tension wires 4, 5, 6, and 7. As shown in Fig. 4, the lower ends of the tension wires are provided with anchor-shaped members 25, the lateral arms 25ª of which are bifurcated as at 25ᵇ and formed with alined openings to receive screw-threaded shanks 17. Threadedly engaging each shank 17 is an adjusting wheel 26 which is disposed within the bifurcated portion 25ᵇ so that when rotating the wheel, the shank is lowered or elevated according as the wheel is rotated in one direction or the other. To prevent displacement of the shank 17 after it has been once adjusted I provide a nut 27 and a set screw 28 which is mounted in the arm 25ª, as shown.

Referring now to Figs. 2 and 3, 15 and 16 designate rods which have their upper ends secured to the horizontal portion of the yoke 23, their lower ends having a ball and socket connection 29 with bars 30 of a frame F. In the yoke 23 there is fixed a rod 14, which, when the frame F is connected with the rods 15 and 16, engages in one end of a tube 40 in the frame. In the other end of this tube there is arranged a threaded rod 41 provided with a handle 42, by means of which the rod 41 can be turned. By turning the rod to the right the rod 41 is moved into the tube, thereby contacting with the free end of the rod 14 so that the frame F is caused to move downward along the rod 14, whereby the frame will be supported in an efficient manner by the pull from the rods 15 and 16 and at the same time the frame may readily be taken off.

As shown in Fig. 3, the lower ends of the shanks 17 are formed with balls 8 either of which fits within a socket 18 formed on a sleeve 31. Secured within each sleeve 31 by means of a cotter pin 32 is the upper end of a wire 33. These wires 33 have a sliding fit within tubular uprights 34 of the frame F, and are adapted when moved axially to actuate teat-cups (not shown). Those portions of the wires 33 which extend below the frame F are inclosed in a flexible tube 35. Such a construction is commonly known as a Bowden-wire, from Bowden, the name of the inventor.

In the present instance I have shown only those shanks 17 operatively connected with the wires 33 which are on the left side of the members 25, this set of shanks being used when milking the left of the two cows, for which that set of tension wires 4—7 and members 25 is intended, which is shown in the drawings, while the set of shanks on the opposite side of the members 25 are employed when milking the cow on the right with the same or another frame F and wires 33.

The operation of the foregoing apparatus is as follows:

Under the action of the driving means 1, the cables 2 and 3 are reciprocated to cause an oscillatory movement of the shaft 22. This in turn imparts a similar movement to the pulleys 24 thereby moving the tension wires 4, 5, 6, and 7 axially, as will be understood. The movement of the tension wires is imparted to the Bowden wires 33, which latter in turn actuate suitable forms of teat-cups. As the teat-cups form no part of the present invention, they have not been illustrated. When it is desired to vary or adjust the stroke of any Bowden-wire 33, so as to vary the action of its respective teat-cup, the respective shank 17 is adjusted, as has been described, whereby the length of the corresponding tension cable is shortened or lengthened according as the shank is adjusted upwardly or downwardly. In this manner, the working stroke of all the Bowden-wires is automatically adjusted so that one and the same cow will always be milked with the same individual force and intensity at each milking operation. With the double actuating means above described arranged over and between each pair of cows, it is obvious that after such double means has been once adjusted, each cow will always be milked in one and the same manner regardless of which of the detachable frames F and its Bowden-wires are used.

Usually only one frame F is necessary for milking about twenty cows, so that this frame must be connected successively with ten sets of rods 14—16 and twenty sets of balls 8 which sets of rods are fixed at suitable intervals along the reciprocating cables 2, 3 in such a manner that they hang down between the cows of each pair.

Although I have herein shown and described only one form of apparatus embodying my invention, it is to be understood that various changes and modifications may be made herein without departing from the spirit of the invention and the spirit and scope of the appended claims.

Having now particularly described the nature of my invention and the manner of its operation, what I claim is:

1. A milking machine comprising teat-cup actuating cables, driving means connected to each of said cables, and adjusting means interposed between each cable and driving means to independently vary the amount of movement imparted to the cable from its respective driving means.

2. A milking machine comprising a plurality of extensible driving cables adapted to be reciprocated, a frame, tension rods supporting said frame, said cables and rods being universally connected to said frame, and Bowden-wires operatively connected to said frame and adapted to actuate teat-cups.

3. A milking machine comprising a frame, reciprocating driving cables universally connected to said frame, means for adjusting each of said cables longitudinally to vary the amount of movement of the cable, and Bowden-wires adjustably connected to each of said cables.

In testimony whereof I have signed my name to this specification.

GUST. von POST.

Witnesses:
A. W. BAGGE,
FRANK LYONS.